(12) United States Patent
Niinomi et al.

(10) Patent No.: US 7,903,689 B2
(45) Date of Patent: Mar. 8, 2011

(54) METHOD AND SYSTEM FOR PACKET REASSEMBLY BASED ON A REASSEMBLY HEADER

(75) Inventors: Tadafusa Niinomi, Kawasaki (JP); Shinji Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 11/104,513

(22) Filed: Apr. 13, 2005

(65) Prior Publication Data

US 2005/0281287 A1  Dec. 22, 2005

(30) Foreign Application Priority Data

Jun. 21, 2004  (JP) ................ 2004-182944

(51) Int. Cl.
*H04J 3/24* (2006.01)
*H04J 3/00* (2006.01)
(52) U.S. Cl. .............. 370/474; 370/475; 370/476
(58) Field of Classification Search ......... 370/474, 370/475, 476, 473
See application file for complete search history.

(56) References Cited

U.S. PATENT DOCUMENTS

| | | | |
|---|---|---|---|
| 6,341,129 B1 * | 1/2002 | Schroeder et al. | 370/354 |
| 6,963,561 B1 * | 11/2005 | Lahat | 370/356 |
| 2001/0048681 A1 * | 12/2001 | Bilic et al. | 370/389 |
| 2002/0051466 A1 * | 5/2002 | Bruckman | 370/474 |
| 2003/0182127 A1 * | 9/2003 | Pan et al. | 704/270.1 |
| 2004/0071096 A1 * | 4/2004 | Na et al. | 370/252 |
| 2005/0129020 A1 * | 6/2005 | Doyle et al. | 370/392 |

FOREIGN PATENT DOCUMENTS

| | | |
|---|---|---|
| JP | 3-150943 | 6/1991 |
| JP | 6-85822 | 3/1994 |
| JP | 9-98189 | 4/1997 |
| JP | 10-257070 | 9/1998 |
| JP | 2000-101613 | 4/2000 |
| JP | 2000-341333 | 12/2000 |

OTHER PUBLICATIONS

Office Action issued in corresponding Japanese Patent Application No. 2004-182944, mailed on Sep. 4, 2007.

* cited by examiner

*Primary Examiner* — Chi H Pham
*Assistant Examiner* — Farah Faroul
(74) *Attorney, Agent, or Firm* — Staas & Halsey LLP

(57) ABSTRACT

In a control method of communication system in which primary packet output from an information processor in a transmitting end is sent to a network after fragmentation into a plurality of secondary packets in a communication controller at the transmitting end, and a plurality of secondary packets are sent to an information controller at the receiving end after reassembly for recovery of the primary packet by the communication controller at a receiving end, a reassembly header for processing the primary packet is sent to the information processor at the receiving end before the reassembly processing of the secondary packets is finished, and protocol processing in which the information processor analyzes the reassembly header is executed in parallel with reassembly processing of the packets in an information controller.

11 Claims, 18 Drawing Sheets

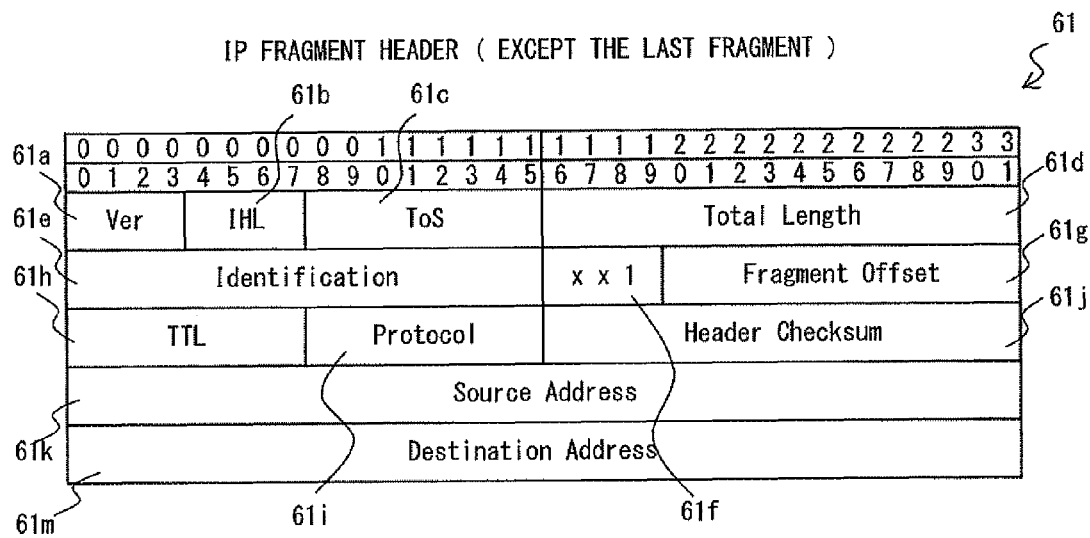
F I G. 6

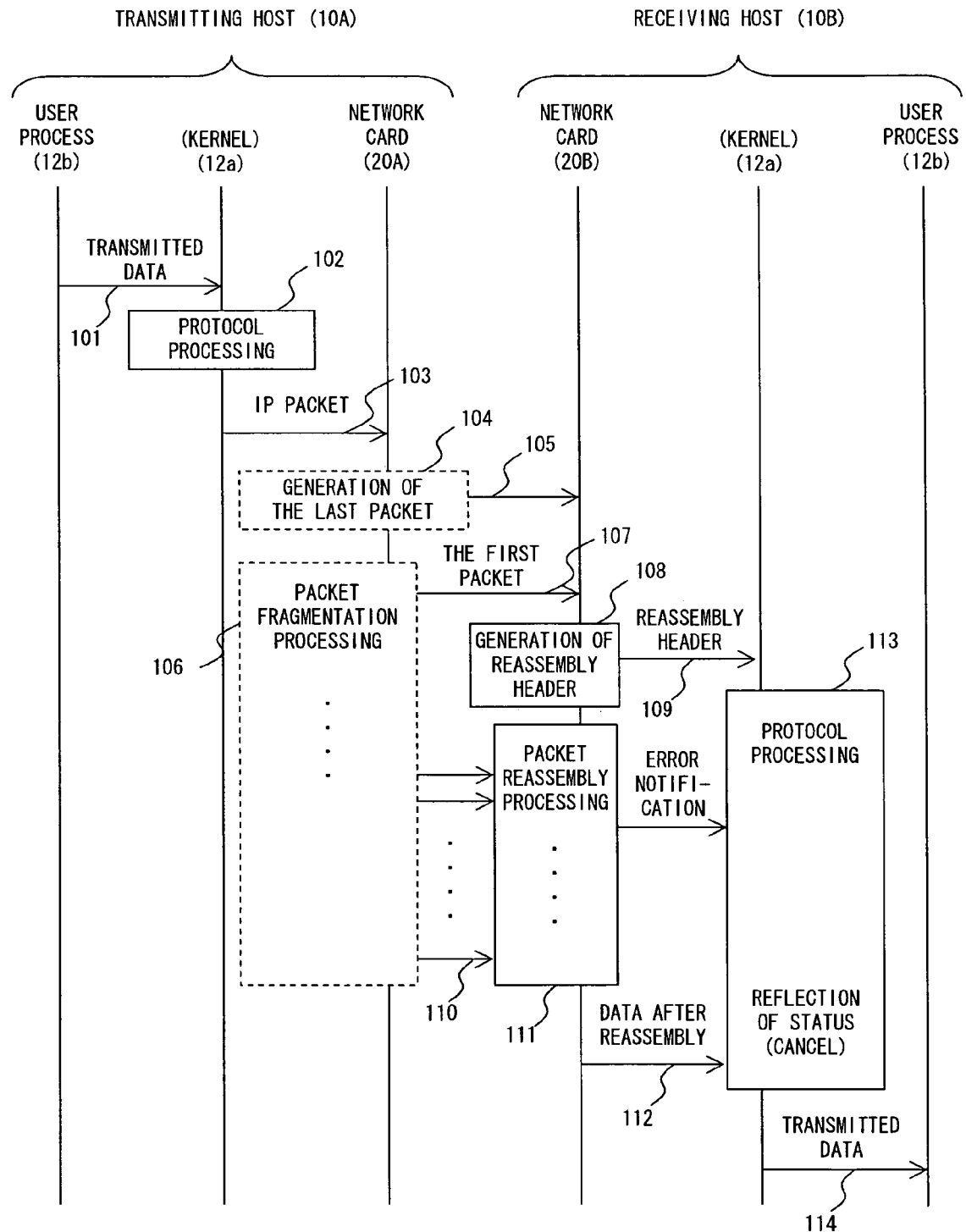
F I G. 9

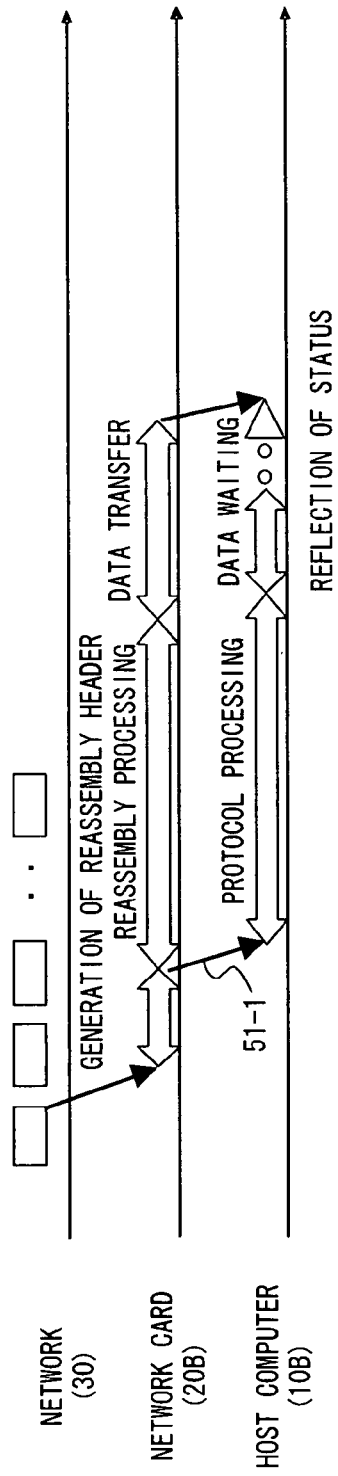
F I G. 10 A
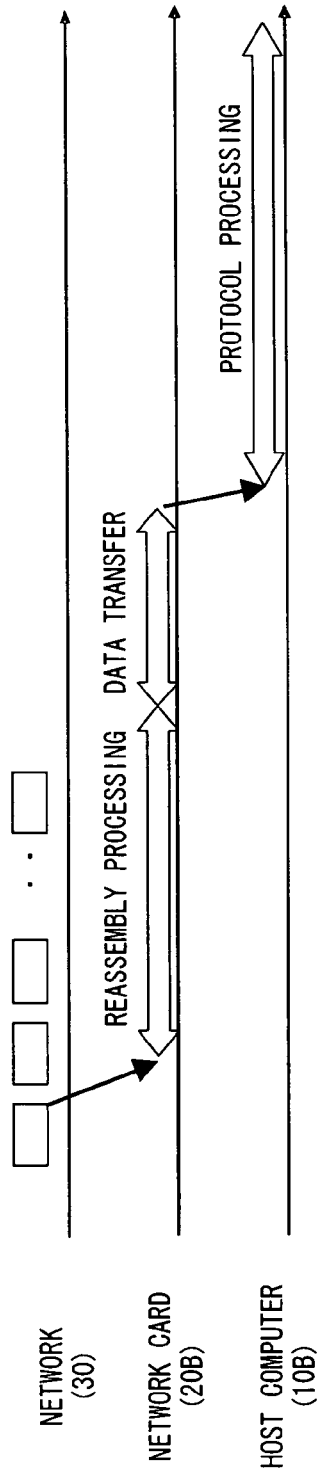
F I G. 10 B

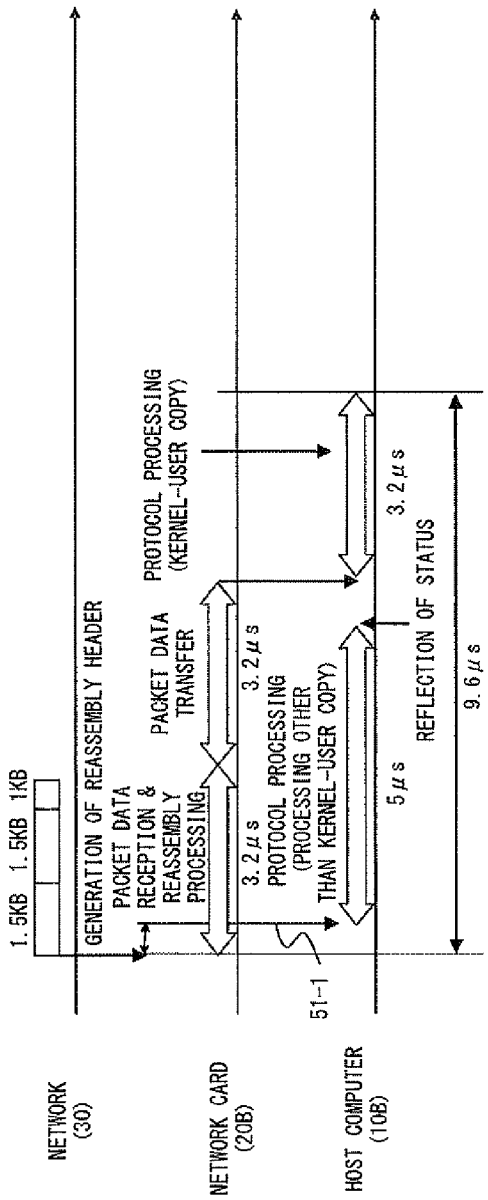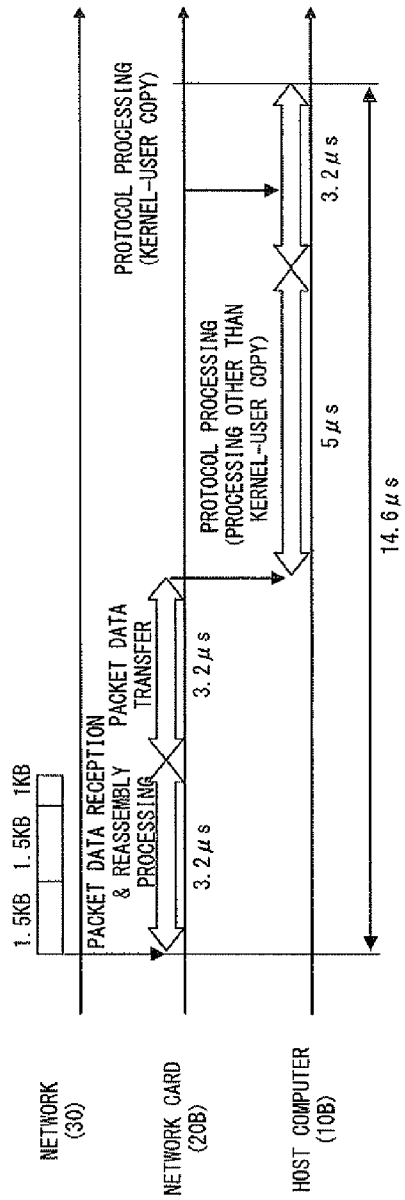

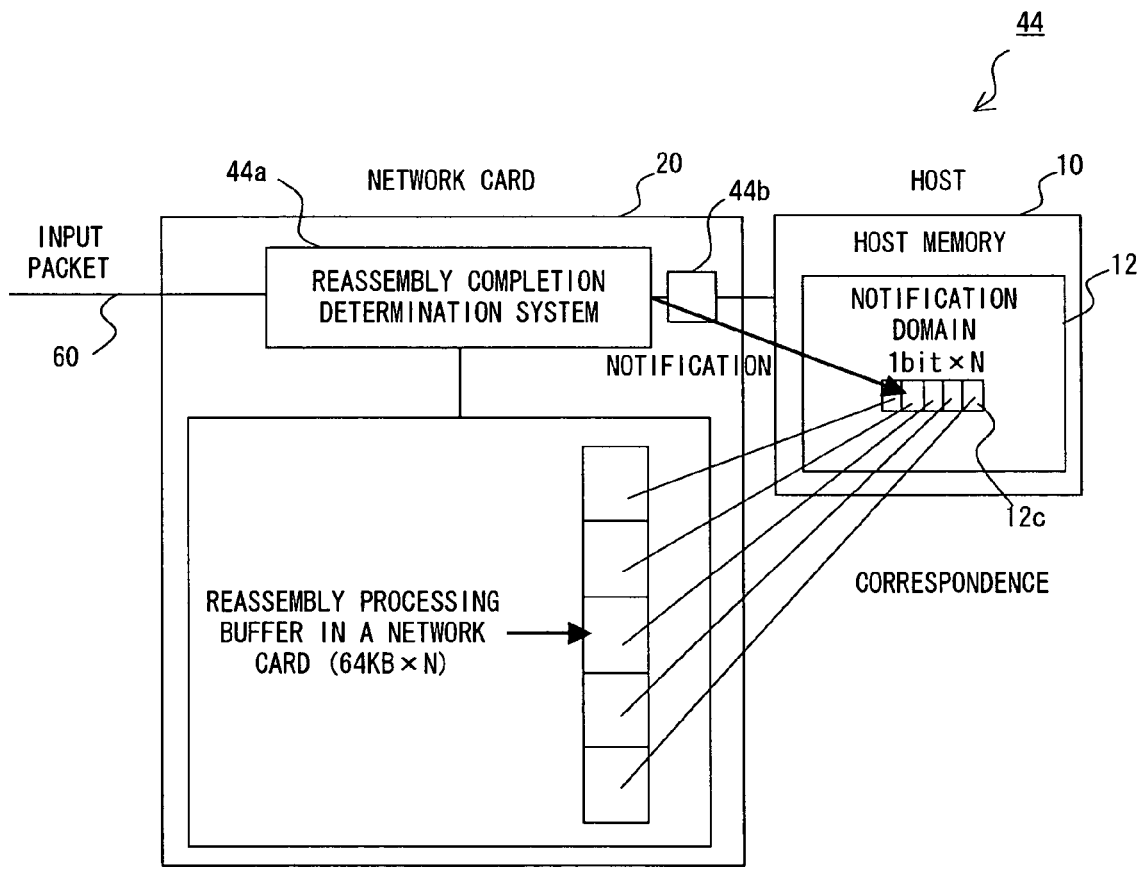
F I G. 15

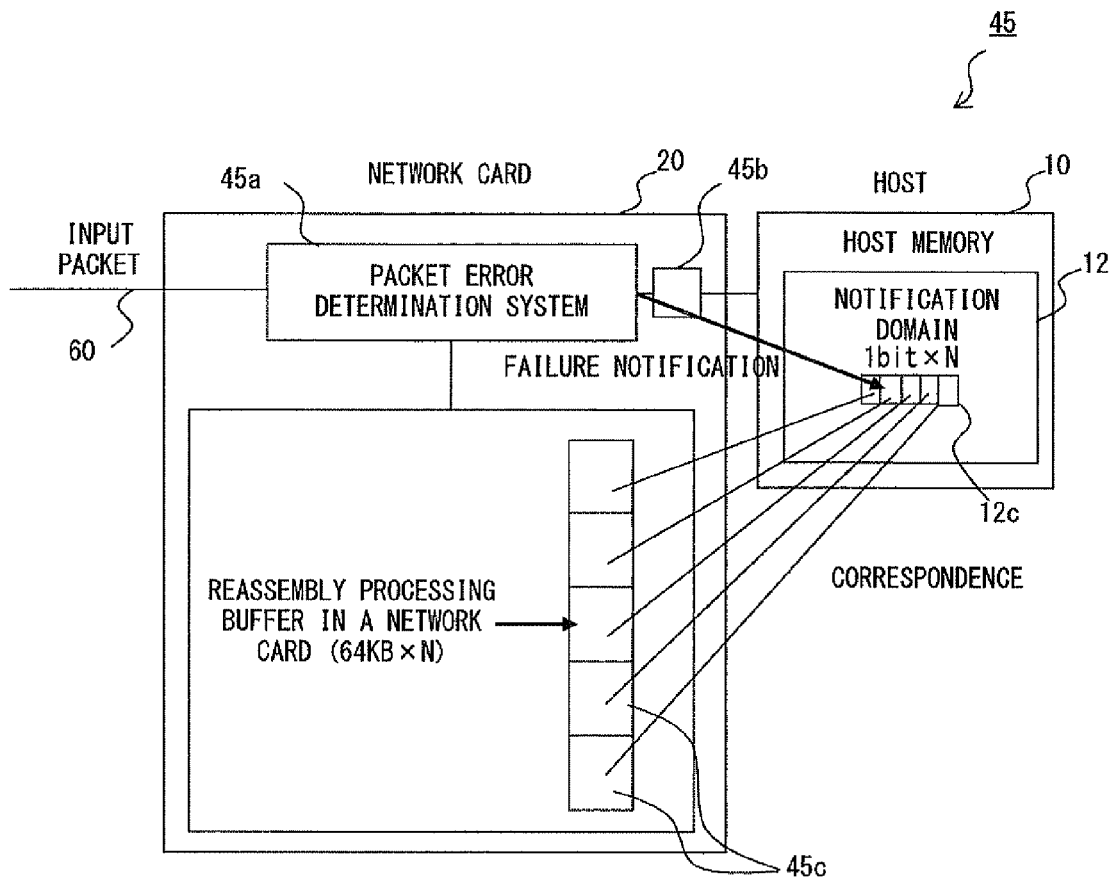
F I G. 1 6

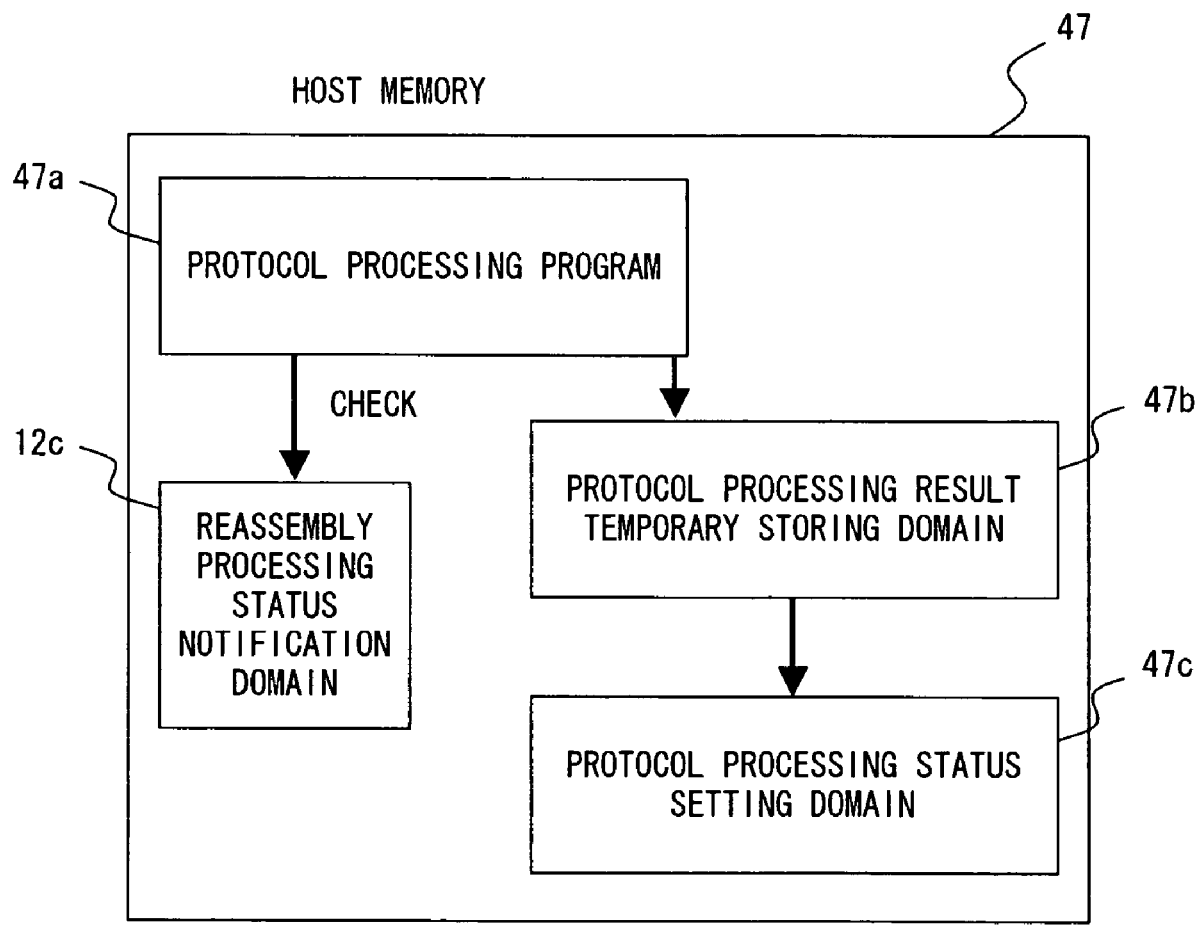
F I G. 1 8

METHOD AND SYSTEM FOR PACKET REASSEMBLY BASED ON A REASSEMBLY HEADER

BACKGROUND OF THE INVENTION

1. Field of the Invention

The present invention relates to a control method of a communication system, a communication controller, a control method of a data processing system, a communication system and programs. More specifically, the present invention relates to a technology, which is effective and can be adopted as a computer network technology, which executes packet transfer communication using communication protocols such as TCP/IP (Transmission Control Protocol)/(Internet Protocol).

2. Description of the Related Art

In the field of computer networks, physical media for high-speed networks have developed and have become increasingly popular year after year. Today, it is not exceptional for personal computers to comprise ports for Gigabit Ethernet, and a network adapter (hardware connected to the information processor for transferring data to networks) for use with 10-Gigabit Ethernet (Trademark) is available.

Although the physical media have developed supporting increased data rates, the processing speed of TCP/IP, the predominant protocol of use in computer networks, has not caught up with the transmission rates of the physical media. Even in an ultrahigh-speed network such as 10 Gbit Ethernet, the actual transmission rate of the information processor even with an extremely high-speed CPU cannot equal the speed of the physical media, which gives rise to the issue that it is not possible to fully utilize the communication capacity of the network. Technologies for addressing the issue of protocol processing and for speeding up communications have been much examined.

The technology for high-speed protocol processing currently prevalent is a technology called TCP segmentation offload. According to this technology, packets are transferred with a size larger than the maximum size (MTU) that can be transferred to a network when transferred from an information controller to a network adapter. Over-sized packets are divided into packets of a size which can be transferred to the network by the network adapter. By so doing, a transmitting information controller can generate packet headers in units of large data size, reducing the frequency of protocol processing for packet header generation. Consequently, it is possible for a CPU with low capacity to transfer a large quantity of data at high-speed.

This idea can be applied to the receiving end. That is, the loading of the protocol processing can be reduced in the information controller by assembling a large-sized packet from small-sized packets and transferring it to the information controller (as in Patent Document 1, for example).

This reassembly processing allows improvement of communication throughput (transferred data volume per unit of time), however because the information controller cannot start protocol processing during reassembly processing by the network adapter, an issue remains that communication delay time increases.

TCP segmentation offload is a method, which divides segments at the TCP level. Besides this method, there is an approach to reduce the loading of the host by dividing packets at the IP level. For example, Patent Document 2 describes a method to reduce the loading of the source and the destination information controllers by reassembly and fragmentation between Ethernet IP packets and the data in the high-speed bus of a communication server lying between the external Ethernet and the high-speed bus interconnecting servers instead of a network.

As explained above, the loading of protocol processing in an information controller can be reduced by accumulating the packets received via a network, reassembling the packets into a large packet and transferring the packet to the information controller. However, the accumulation of the received packets causes a delay in the arrival of the packet to the receiving information controller by the amount of time required for accumulation, thus causing an increase in delay time. The issue to be addressed is to control the increase in packet transfer delay time whilst maintaining the loading reduction effect by packet reassembly processing of the receiving information controller at the receiving end.

Patent Document 1: Japanese Published Unexamined Application No. 06-85822

Patent Document 2: Japanese Published Unexamined Application No. 2000-101613

It is an object of the present invention to provide a technology, which enables the simultaneous pursuit of reduction of loading in the host computer by the fragmentation and reassembly of the transmitted and received packets and reduction of transmission delay time of the transmitted and the received packets.

It is another object of the present invention to provide a technology, which allows the simultaneous pursuit of efficient utilization of the transmission rate of the information network by fragmentation and reassembly of the transmitted and the received packets and reduction in transmission delay time of the transmitted and the received packets.

SUMMARY OF THE INVENTION

It is the first aspect of the present invention to provide a communication system control method, comprising steps of dividing a primary packet output from an information processor at the transmitting end into a plurality of secondary packets at a communication controller at the transmitting end and sending them to a network and reassembling the secondary packets to recover the primary packet at a communication controller at the receiving end and sending the packet to an information processor at the receiving end, wherein the communication controller at the receiving end sends a reassembly header, for processing the primary packet before reassembly processing of the secondary packets finishes, to the information controller at the receiving end, and the information processor executes protocol processing, during which the information processor analyzes the reassembly header and is executed in parallel with the reassembly processing of the secondary packets in the communication controller.

It is the second aspect of the present invention to provide a communication controller, which controls the transmission and reception of data lying between an information processor and a network, comprising a function of transferring, after the reception and reassembly, a plurality of the secondary packets generated by fragmentation of the primary packet at the transmitting end to the information processor at the receiving end; and a header analysis function for generating a reassembly header for processing the primary packet reassembled from the secondary packets and sending the packet to the information processor at the receiving end before the completion of the reassembly of the secondary packets.

It is the third aspect of the present invention to provide a communication controller, lying between an information processor and a network and comprising a function for generating the secondary packets by fragmentation of the primary packet received from the information processor and sending it to the network, wherein further comprised is a function for sending the secondary packets, comprising the data required to generate the reassembly header for processing the primary packet after reassembly, advance to the other secondary packets to the network.

It is the fourth aspect of the present invention to provide a communication controller, lying between an information processor and a network and comprising a function for generating the secondary packets by fragmentation of the primary packet received from the information processor and sending the secondary packets to the network, wherein further comprised is a function for sending the tertiary packet, comprising the data required to generate the reassembly header for processing the primary packet after reassembly, separately from the secondary packets to the network.

It is the fifth aspect of the present invention to provide a control method of an information processing system, comprising an information processor and a communication controller lying between the information processor and the network, wherein, when transferring a packet reassembled by the communication controller from a plurality of packets fragmented and sent to the network at the transmitting end, the method comprises steps of sending out a reassembly header, for processing the reassembled packet, to the information processor before completion of reassembly processing of the packets by the communication controller, and executing protocol processing in which the information processor analyzes the reassembly header in parallel with reassembly processing of the packets in an information controller.

Specifically, in the present invention, for the purpose of controlling the increase in delay time, before the reassembly of the packet at the receiving end, a header for the reassembled packet is generated by the communication controller at the time that the primary packet is received by a communication controller such as a network card and sent to the higher layer information controller to start protocol processing.

In order to generate the header for the reassembled packet and to determine whether to reassemble subsequent packets from the network or not, a simple header analysis system in the communication controller can be comprised.

By so doing, parallel operation of the protocol processing of the information processor and reception of subsequent packets to be reassembled by the communication controller can be executed. The protocol processing of the information processor can be started immediately upon reception of the header and completed at the time of transfer of all packet data to be reassembled by the communication controller. If data is not received within a designated time period, the processing is re-attempted with the received data or the data is dropped.

BRIEF DESCRIPTION OF THE DRAWINGS

FIG. 6 is a schematic diagram showing the configuration of an IP fragment packet header, except for the last IP fragment packet header, which is used in the communication system of one embodiment of the present invention;

FIG. 9 is a flowchart showing the transmission and receiving processing in the communication system of one embodiment of the present invention;

FIG. 10A is a schematic diagram showing the effects of the control methods of the communication system of the present invention;

FIG. 10B is a schematic diagram showing the effects of the conventional methods;

FIG. 11A is a schematic diagram showing the effects of the of the control method of the communication system of the present invention;

FIG. 11B is a schematic diagram showing a effect of the conventional methods;

FIG. 15 is a schematic diagram showing an example of the configuration of the reassembly completion notifier comprised in the communication controller consisting the communication system, which is an embodiment of the present invention;

FIG. 16 is a schematic diagram showing an example of the configuration of the data error detector/notifier comprised in the communication controller consisting the communication system, which is an embodiment of the present invention;

FIG. 18 is a schematic diagram showing an example of the configuration of the data nullification system comprised in the communication controller consisting the communication system, which is an embodiment of the present invention.

DESCRIPTION OF THE PREFERRED EMBODIMENT

In the following description, details of the preferred embodiment of the present invention are set forth with reference to the drawings.

Figure 1:
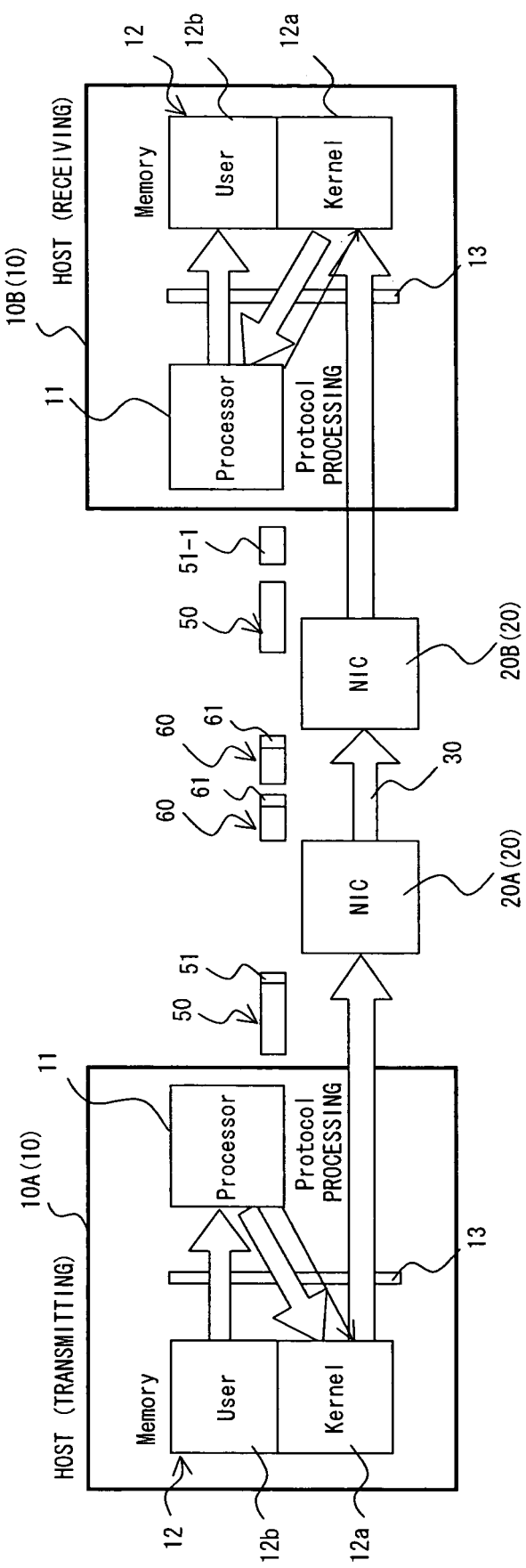
FIG. 1 is a schematic diagram describing a configuration of a communication system of one embodiment of the present invention.
Figure 2:
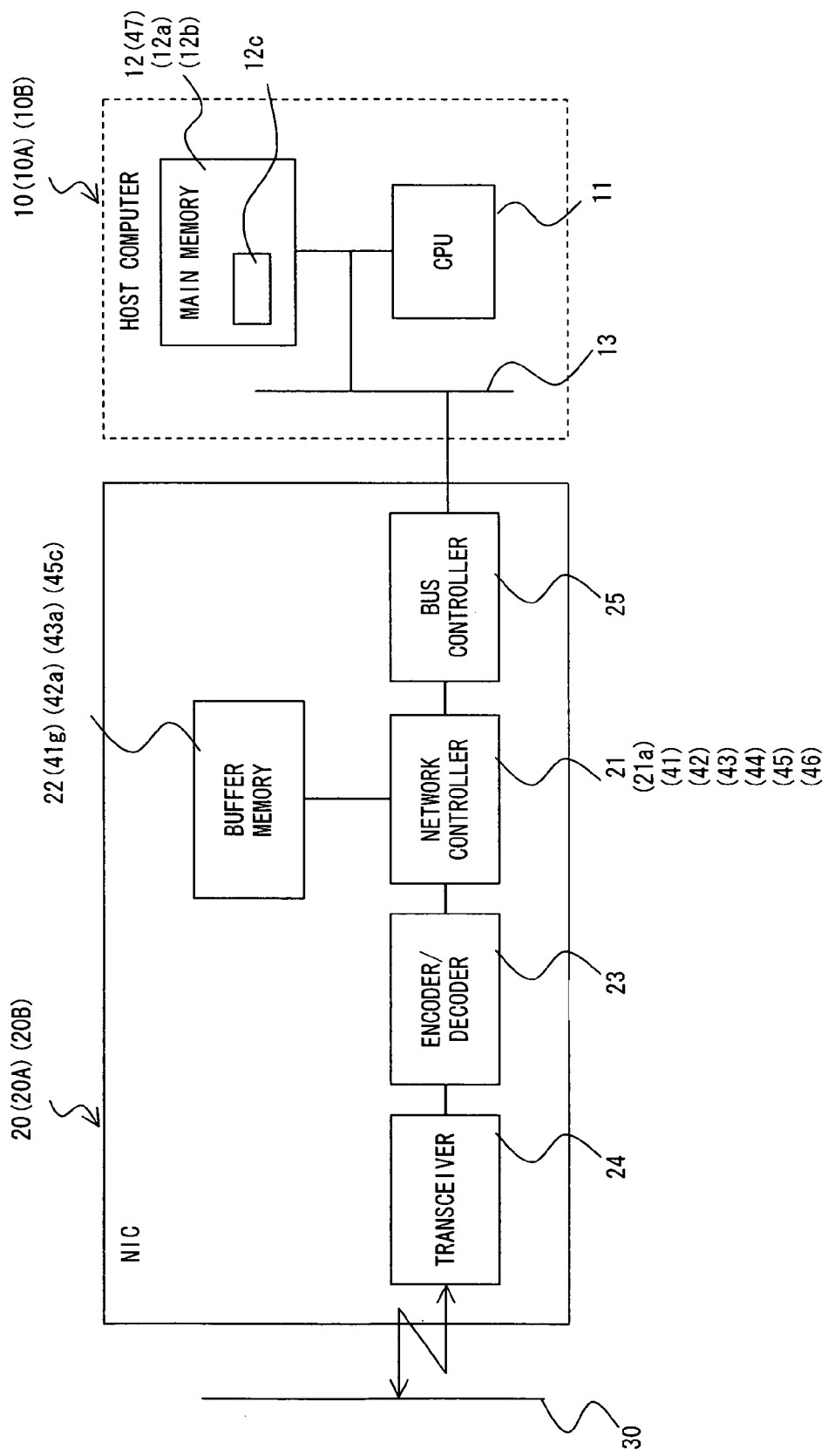
FIG. 2 is a schematic diagram describing a configuration of a communication controller and a data processor, comprised in the communication system of the present embodiment.

FIG. 1 is a schematic diagram describing a configuration of a communication system of one embodiment of the present invention. FIG. 2 is a schematic diagram illustrating a configuration of a communication controller and a data processor, comprised in the communication system of the present embodiment.

The communication system of the present embodiment comprises a transmitting host 10A with a transmission side communication controller 20A, a receiving host 10B with a reception side communication controller 20B, and an information network 30 lying between the transmission side communication controller 20A and the reception side communication controller 20B.

Each of the transmitting host 10A and the receiving host 10B are comprised of an information processor 10 shown in FIG. 2, for example, and each of the transmission side communication controller 20A and the reception side communication controller 20B are comprised of a network card 20 also shown in FIG. 2.

The following description separates the functions of the network card 20 at the transmitting end from the functions of the network card 20 at the receiving end for convenience of explanation. However, transmission and reception are usually performed in one device in data communication, and therefore the transmission side communication controller 20A and the reception side communication controller 20B can be comprised of a single network card 20.

The information processor 10 comprises a CPU 11, which controls the entire device, main memory 12, which stores data and programs run by the CPU 11, and a memory bus 13, which connects the CPU 11 and the main memory 12.

In the main memory 12, programs such as a Kernel 12a, operating system software, and User processes 12b operating at a higher level than the Kernel 12a are implemented. Execution of these programs in the CPU 11 allows data communication over the information network 30.

The network card 20 comprises a network controller 21, buffer memory 22, an encoder/decoder 23, a transceiver 24, and a bus controller 25.

The network controller 21 controls transmission and reception of data, more specifically, sending packets to the information network 30 after fragmentation of the packets transmitted by the information processor 10 and passing out the fragmented packet arriving via the information network 30 to the information processor 10 after reassembling the fragmented packets. The network controller 21 is comprised of, for example, microcomputers and logic circuits. The operation of the network controller 21 by a program stored in a built-in ROM (not shown in drawings) realizes various functions as hereinafter explained.

The buffer memory 22 is used to temporarily hold packets for the purpose of fragmentation and reassembly processing of the packets, and is also used to store management information.

The encoder/decoder 23 performs operations such as encoding the data of the transmitted packet to the data for communication and decoding the encoded data from the transmitting end.

The transceiver 24 transmits and receives the transmitted and received data, encoded by the encoder/decoder 23, after converting the data into signal form, which is compatible with the physical communication medium comprising the information network 30.

The bus controller 25 controls data transfer via the memory bus 13 between the buffer memory 22 and the main memory 12 of the information processor 10. It also mediates the access of the information processor 10 to the main memory 12 by the network controller 21.

In this embodiment, an IP packet with a maximum size of 64 KB (kilobytes) at the transmitting host 10A is divided into IP fragments (packets) by the transmission side communication controller 20A. The reception side communication controller 20B receives the IP fragments (packets). The payload in the IP packet before fragmentation includes a TCP packet.

Figure 3:
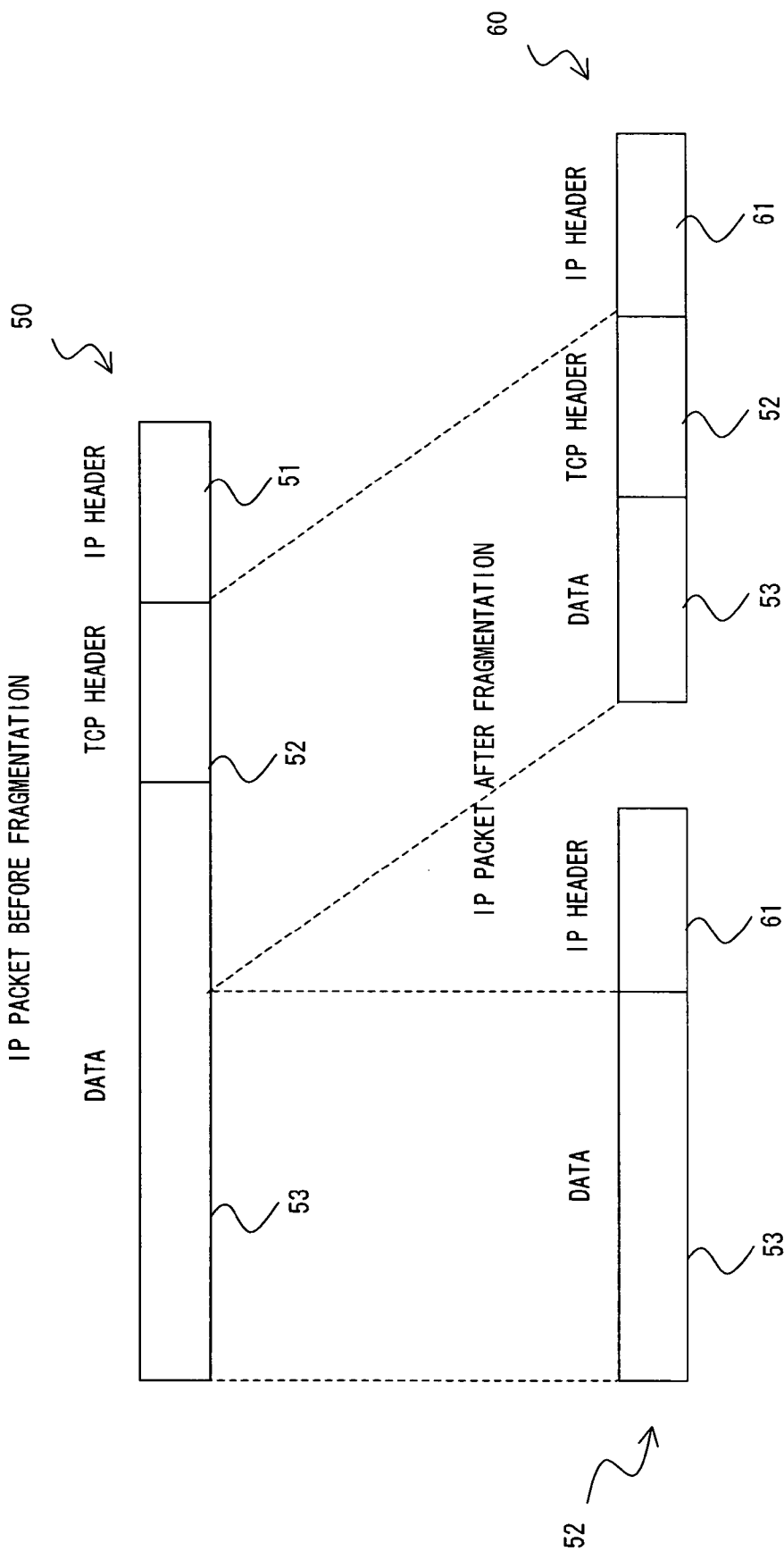
FIG. 3 is a schematic diagram describing fragmentation of a packet in the communication system of the present embodiment.

FIG. 3 is a diagram describing fragmentation of a packet in the present embodiment. The IP packet 50 (primary packet) before fragmentation contains an IP header 51, a TCP header 52, and data 53. This IP packet 50 is generated by the transmitting host 10A, and is passed to the transmission side communication controller 20A.

In the transmission side communication controller 20A, a plurality of IP fragment packets 60 (secondary packets) are formed by the fragmentation of an IP packet 50. An IP fragment header 61 is added to each individual IP fragment packet 60. The size of each IP fragment packet 60 is set to the maximum size which can be transferred by the information network 30. By so doing, the transmitting host 10A reduces the frequency, that is the loading, of transmission protocol processing, which comprises generating and adding an IP header and a TCP header to the head of the data 53, by setting the length of the IP packet 50 to a size over the maximum size of the information network 30.

Figure 4:
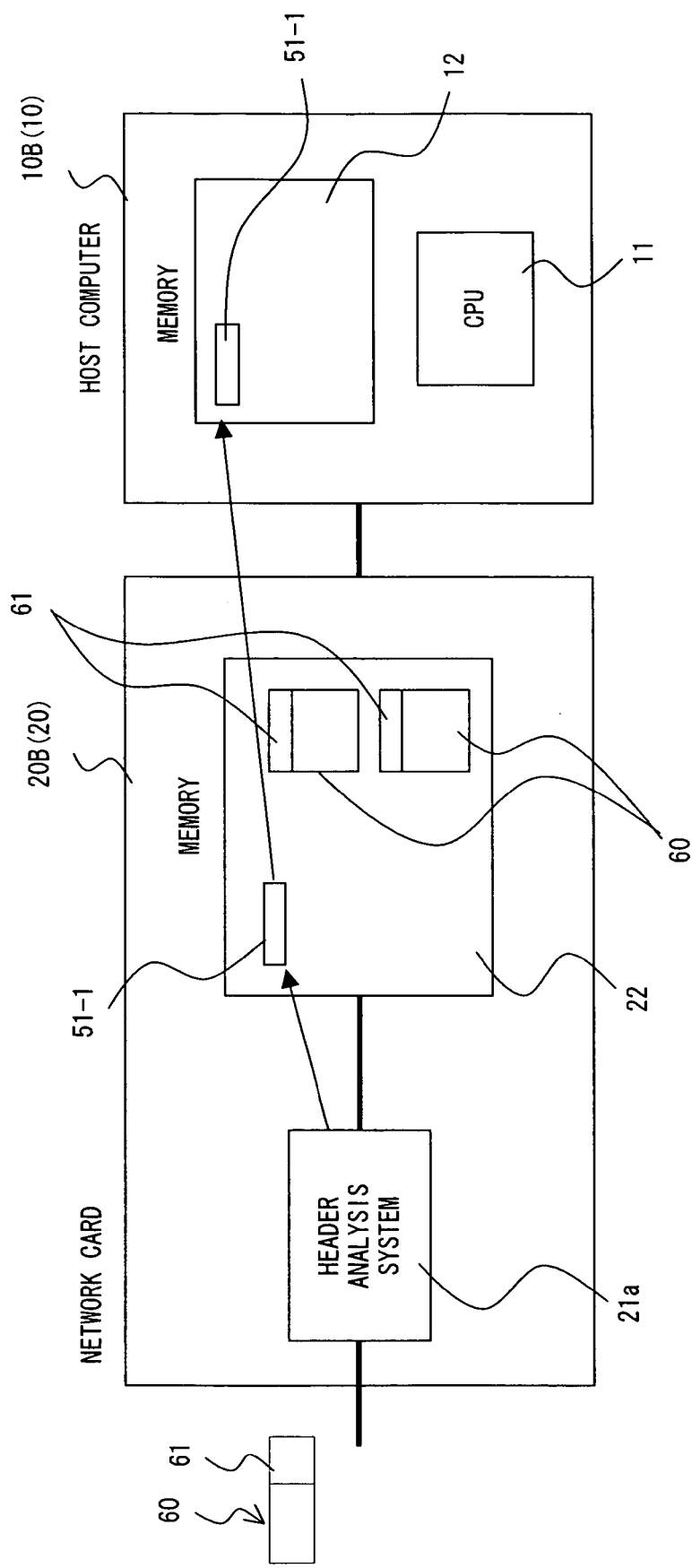
FIG. 4 is a schematic diagram showing an internal configuration of a communication controller comprising the communication system of one embodiment of the present invention.

As described in FIG. 4, in the case of the present invention, the network controller 21 of the network card 20, which is the reception side communication controller 20B, comprises a header analysis system 21a. When a plurality of IP fragment packets 60 are reassembled and are passed to the receiving host 10B, an analysis of the IP fragment header 61 of an individual IP fragment packet 60 enables generation of the reassembly header 51-1 used after reassembly, passing of it to the receiving host 10B before the data, and simultaneous execution of reassembly processing of the IP fragment packet 60 by the network card 20 and protocol processing at the receiving host 10B.

The reassembly header 51-1 is, as described later, generated in the header analysis system 21a, comprised in part of the network controller 21, so as to comprise the data, among other data in the IP header 51 in the IP packet 50 after reassembly, required to start the receiving end protocol processing at the receiving host 10B.

A method for regenerating the reassembly header 51-1 from the IP fragment packet 60 is explained below.

Figure 5:
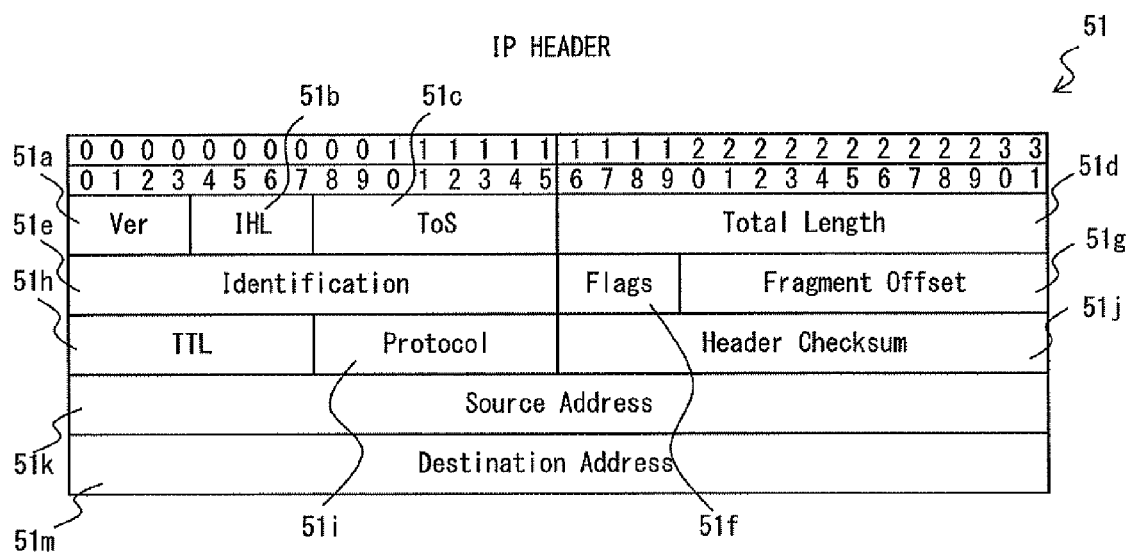
FIG. 5 is a schematic diagram showing the configuration of an IP packet header before fragmentation used in the communication system of one embodiment of the present invention.

As FIG. 5 describes, the IP header 51 of the IP packet 50 before fragmentation comprises the data of version 51a, of the IP header length 51b, of the type of service Sic, of the packet length (total length) 51d, of the identifier (identification) 51e, of the flags 51f, of the fragment offset 51g, of the time to live (TTL) 51h, of the protocol 51i, of the header checksum 51j, of the source IP address 51k and of the destination IP address 51m.

With the exception of the last fragment packet, the IP fragment header 61 of an IP fragment packet 60 after fragmentation, as shown in FIG. 6, comprises the data of version 61a, of the IP header length 61b, of the type of service 61c, of the packet length (total length) 61d, of the identifier 61e, of the flags 61f, of the fragment offset 61g, of the time to live (TTL) 61h, of the protocol 61i, of the header checksum 61j, of the source IP address 61k and of the destination IP address 61m. The flags 61f contain "xx1" (where x, represents either 0 or 1).

Figure 7:
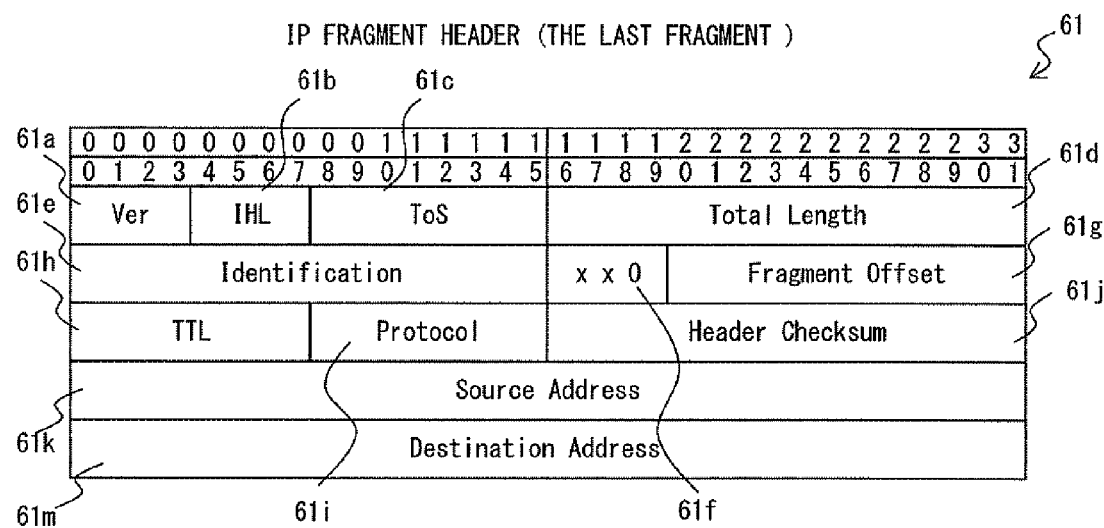
FIG. 7 is a schematic diagram showing the configuration of the last IP fragment header used in the communication system of one embodiment of the present invention.

The IP fragment header 61 of the last IP fragment packet 60, as described in FIG. 7, has the same structure as the other IP fragment headers 61 (FIG. 6), except that the last bit of the flags 61*f,* "xx0", is different.

Reassembly of the IP fragment packet 60 is possible referencing such an IP fragment header 61 using the identifier 61*e* (identification), the flags 61*f,* the fragment offset 61*g,* and the packet length 61*d* (total length).

One bit in the flags 61*f* indicates whether or not more fragments follow the IP fragment packet. The fragment offset 61*g* specifies the offset of the fragment from the original datagram in units of 8 bytes starting from 0. The packet length 61*d* (total length) is the length in units of bytes of the IP fragment packet (including the header and the data). The IP fragment packets 60 to be reassembled have the same value in the identifier 61*e* (identification).

In the case of IP fragment packet 60, the IP header after the reassembly processing (the packet header after the fragment reassembly) is obtained from the last fragment of the IP fragment header 61. Because the TCP header of the packet after reassembly processing is in the first fragment, both the first and the last fragments of the IP fragment packet 60 are required to generate the reassembly header 51-1 sent to the receiving host 10B.

The network card 20 at the receiving end inputs the IP fragment packet 60 to the reassembly packet header generator 41 of the network controller 21, shown in FIG. 10A and described later. When the reassembly packet header generator 41 recognizes the last fragment, it generates the IP header after reassembly processing (i.e. reassembly header 51-1) of the fragments.

Figure 8:
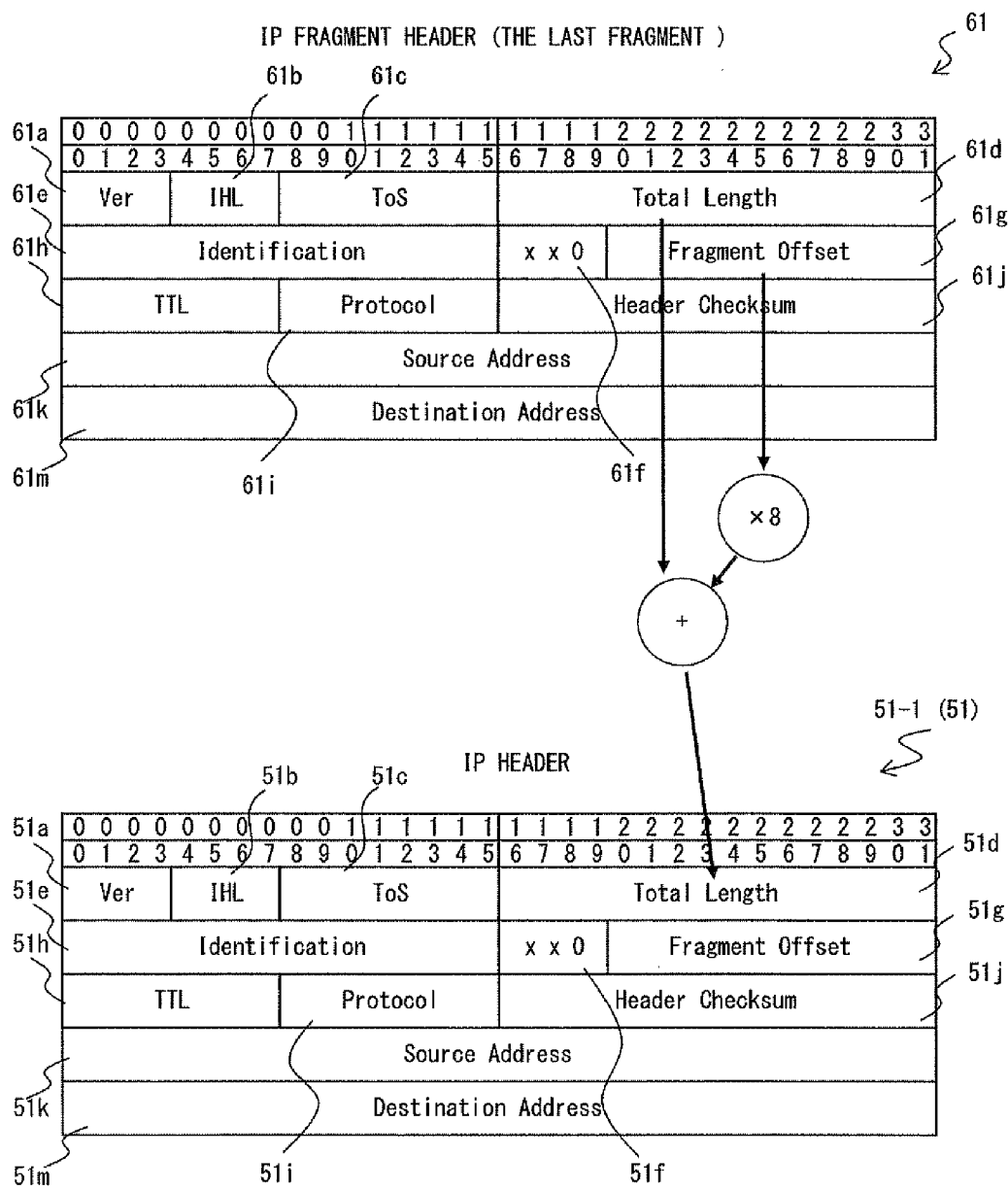
FIG. 8 is a schematic diagram indicating a method of reassembly header generation in the communication controller comprising the communication system of one embodiment of the present invention.

More specifically, the packet length 61*d* (total length) of the reassembled IP fragment header 61, shown in FIG. 7, should be replaced with the packet length 61*d* (total length) of the last IP fragment packet 60+the fragment offset 61*g* of the last IP fragment packet 60×8 (61*d*+[61*g*×8]), and the header checksum 61*j* recalculated. The reassembly packet header generator 41 carries out this calculation, as shown in FIG. 8.

The combination of the header obtained by the above method and the TCP header 52, comprised in the first IP fragment packet 60, generates the reassembly header 51-1.

In the case of IP fragmentation, the data to generate the reassembly header 51-1 of the present embodiment is carried by the last fragment (the IP fragment packet 60). For the effective performance of the present invention, the last fragment is required to be transmitted first. For that reason, transmission side communication controller 20A comprises a reassembly packet header advance transmitter 42, explained in FIG. 13 described later. Generally, in the context of an IP packet 50 stored in the buffer memory 22 of a transmission side communication controller 20A, the last part of the IP packet 50 after fragmentation into IP fragment packets 60 is not transferred first. However, because the entire IP packet 50, which is the transmitted data, is originally stored in the buffer memory 22, it is possible to transfer the last part first.

The reception side communication controller 20B generates the reassembly header 51-1, sends it to the receiving host 10B, and notifies the receiving host 10B that the reassembly header 51-1 was sent. In the present invention, this notification means is realized by allocating a notification domain 12*c* in a part of the main memory 12 of the receiving host 10B, by accessing the notification domain 12*c* through the bus controller 25 and writing the notification flag data.

Other means such as generating an interrupt at the receiving host 10B, polling the reception side communication controller 20B from the receiving host 10B, or a combination of the above means are also feasible.

When the receiving host 10B recognizes the arrival of the reassembly header 51-1, the receiving host 10B executes the protocol processing of the receiving end with reference to the reassembly header 51-1. For protocols such as TCP, which update the connection status, only operations to determine the updated value are executed during this protocol processing. The result is not yet set (See FIG. 18 described later).

During the processing operation, the IP fragment packets 60 generated at the transmitting end (by the transmission side communication controller 20A) arrive in sequence from the information network 30. The protocol processing using the reassembly header 51-1 of the receiving host 10B and the arrival of the data (the IP fragment packets 60) from the information network 30 proceed in parallel.

The data arriving at the reception side communication controller 20B can be processed by any of the following methods: a method of storing the data in the buffer memory 22 of the reception side communication controller 20B until the protocol processing of the receiving host 10B is finished; a method of transferring the data to the receiving host 10B upon finishing the reassembly processing; and a method of transferring the data in sequence to the receiving host 10B without storing it in the reception side communication controller 20B.

The present embodiment adopts the method of storing the data in the buffer memory 22 of the reception side communication controller 20B until protocol processing at the receiving host 10B is finished. Upon completion of the reassembly of a plurality of IP fragment packets 60 in the reception side communication controller 20B, the receiving host 10B is notified of the completion. When the receiving host 10B recognizes the completion, it sets the updated status of the protocol processing, transferring the reassembled data at the same time.

The above series of processes between the transmitting host 10A and the receiving host 10B during data communication is summarized in a flowchart in FIG. 9.

The communication data generated in the User process 12*b* of the transmitting host 10A is provided to the Kernel 12*a* (Step 101), and is comprised of the IP packet 50, after TCP/IP protocol processing (Step 102), it is passed on to the transmission side communication controller 20A (Step 103).

In the process of fragmentation of the IP packet 50 in the buffer memory 22, the transmission side communication controller 20A first generates the last IP fragment packet 60 (Step 104), and sends it to the reception side communication controller 20B (Step 105). Then fragmentation processing of the unprocessed portion of the IP packet 50 into a plurality of IP fragment packets 60 (Step 106) is executed, and the first IP fragment packet 60 is sent to the reception side communication controller 20B (Step 107).

The reception side communication controller 20B generates the reassembly header 51-1 from the last IP fragment packet 60 received in Step 105 and the first IP fragment packet 60 comprising the TCP header 52 (Step 108). The reassembly header 51-1 is sent to the receiving host 10B (Step 109).

The receiving host 10B, having received the reassembly header 51-1, starts TCP/IP the protocol processing of the receiver host (Step 113).

At this time, the reception side communication controller 20B receives the IP fragment packet 60 sequentially from the transmission side communication controller 20A via the information network 30 (Step 110), and executes reassembly processing to reassemble the original IP packet 50 simultaneously with the protocol processing of the receiving host 10B (Step 111). If errors are detected in the IP fragment packets 60 during the reassembly, the reception side communication controller 20B sends an error notification to the receiving host 10B, if required, using the method described in FIG. 16 and FIG. 17, and passes the reassembled IP packet 50 to the receiving host 10B (Step 112).

Based on the protocol processing result (Step 114) the data received in Step 112 by the receiving host 10B, is transferred to the User process 12b comprised in the receiving host 10B.

When error notification is generated by the reception side communication controller 20B during protocol processing, the protocol processing result is cancelled if needed.

FIG. 10A and FIG. 10B show a comparison of the processing flow in time of the present embodiment with that of the conventional method.

To be more specific, in the conventional method described in FIG. 10B, the reassembly processing of the IP fragment packet 60, the data transfer processing of the reassembled IP packet 50 from the reception side communication controller 20B to the receiving host 10B, and protocol processing at the receiving host 10B are executed sequentially in time. Therefore, fragmentation of the IP packet 50 into the IP fragment packet 60 and recovery of the IP packet 50 in the reception side communication controller 20B involves a large transmission delay time.

Compared with the conventional method, the present embodiment in FIG. 10A, however, enables the parallel operation of the protocol processing in the receiving host 10B and the reassembly processing in the reception side communication controller 20B. Consequently, the delay time caused by the reassembly processing of the IP fragment packet 60 into the IP packet 50 can be reduced. The advantage of this parallel operation in the present invention is especially notable when the protocol processing overhead at the receiving host 10B is high (i.e. it is complicated and time-consuming).

The effects of the present embodiment are presented in FIG. 11A for definite values. FIG. 11A and FIG. 11B show a detailed example in which a 10 Gbps (1.25 GB/s) network is used, and the transmission side communication controller 20A divides the 4 KB IP packet into IP fragments of the MTU (Maximum Transfer Unit), generally used in Ethernet (Trademark), and transmits the IP fragments which are then received by the reception side communication controller 20B. In such a case, the packet is divided into two 1.5 KB packets and a 1 KB packet, and then transferred.

The case of the conventional method as in FIG. 11B is examined first. It takes 4 KB/1.25 GB/s=3.2 µs for the network cards at the receiving end to receive all the packets. The reassembly processing is also executed while the data is transferred from the network to the network cards, and it takes 3.2 µs to complete the reassembly processing.

The data transfer from the network cards to the host computer requires another 3.2 µs under the assumption that the bit-rate of the connection between the network cards and the host computer is 10 Gbps. TCP/IP protocol processing requires 5 µs~10 µs per packet using a 2.4 GHz CPU. The protocol processing additionally requires the step of copying data from the Kernel to User space within the host computer, which takes 3.2 µs to copy 4 KB data at the rate of 10 Gbps. Accordingly, with the conventional method in FIG. 11B, the total time from the arrival of the primary packet to the network cards to complete the protocol processing in the host computer is 14.6 µs where the protocol processing (which can only be executed with the header) takes 5 µs.

The case of the present embodiment as in FIG. 11A, which transfers the reassembly header first, is examined next. In such a case, the receiving host 10B can start the protocol processing on receiving the reassembly header 51-1. The reassembly header generation time+the status updating time can be made significantly smaller than the protocol processing time. Consequently, the reassembly header generation time+the status updating time+the protocol processing time are less than 6.4 µs. The total processing time, which is the sum of the reassembly processing at the reception side communication controller 20B+the data transfer time to the receiving host 10B+the time of duration of the copy between Kernel-User space, is 9.6 µs. As a result, the present embodiment in FIG. 11A reduces the delay time by 35% compared with the conventional method. Such an effect of delay time reduction is useful in application programs (User processes 12b), such as scientific computation, where the delay time of the information network 30 influences its functioning.

As indicated in the above example, the effect of the present embodiment depends on the capacity of the CPU 11 in the receiving host 10B and the packet size of the IP packet 50 before fragmentation. In order to maximize the effect of this method in various systems, the packet size of the IP packet 50 before fragmentation can be selected according to the capacity of the receiving host 10B.

The reassembly header advance transfer method of the present embodiment requires processing based only on the header information of the TCP/IP protocol processing in the receiving host 10B. Basically all processing except the data checksum of TCP is possible with the header information alone. The types of processing are, for example, (Process 1) checking the header size of TCP and IP packets, (Process 2) verification of the header checksum, (Process 3) identification of connection by determination of the source-destination port pair of a TCP session, (Process 4) determination of whether the received data is within the volume of the Receive Window from the sequence number and data size of the received packet, (Process 5) reading the ACK field of the received packet, recognizing the status of reverse stream transfer, and preparation for reuse of the data releasing the buffer of the transferred data. In addition, interrupt handling, which is not generally a process mediated by packets, can be executed in advance at the time that the reassembly header 51-1 arrives at the receiving host 10B.

Some conventional methods have been developed to generate the TCP data checksum in network cards which is used as the checksum offload. In the example above, the checksum is assumed to be calculated at the time when the network card receives the packet from the network. Therefore in the above example the protocol processing at the receiving host 10B does not include the processing of the checksum. In the case of the conventional method, the checksum result is passed to the host on the transfer of the packet via the network.

The reassembly header advance transfer method of the present embodiment makes the assumption that on transferring packet data to the receiving host 10B the checksum result notification is received by the receiving host 10B. Alternatively a method in which errors are detected without data transfer by checksum error detection is also acceptable.

Figure 12:
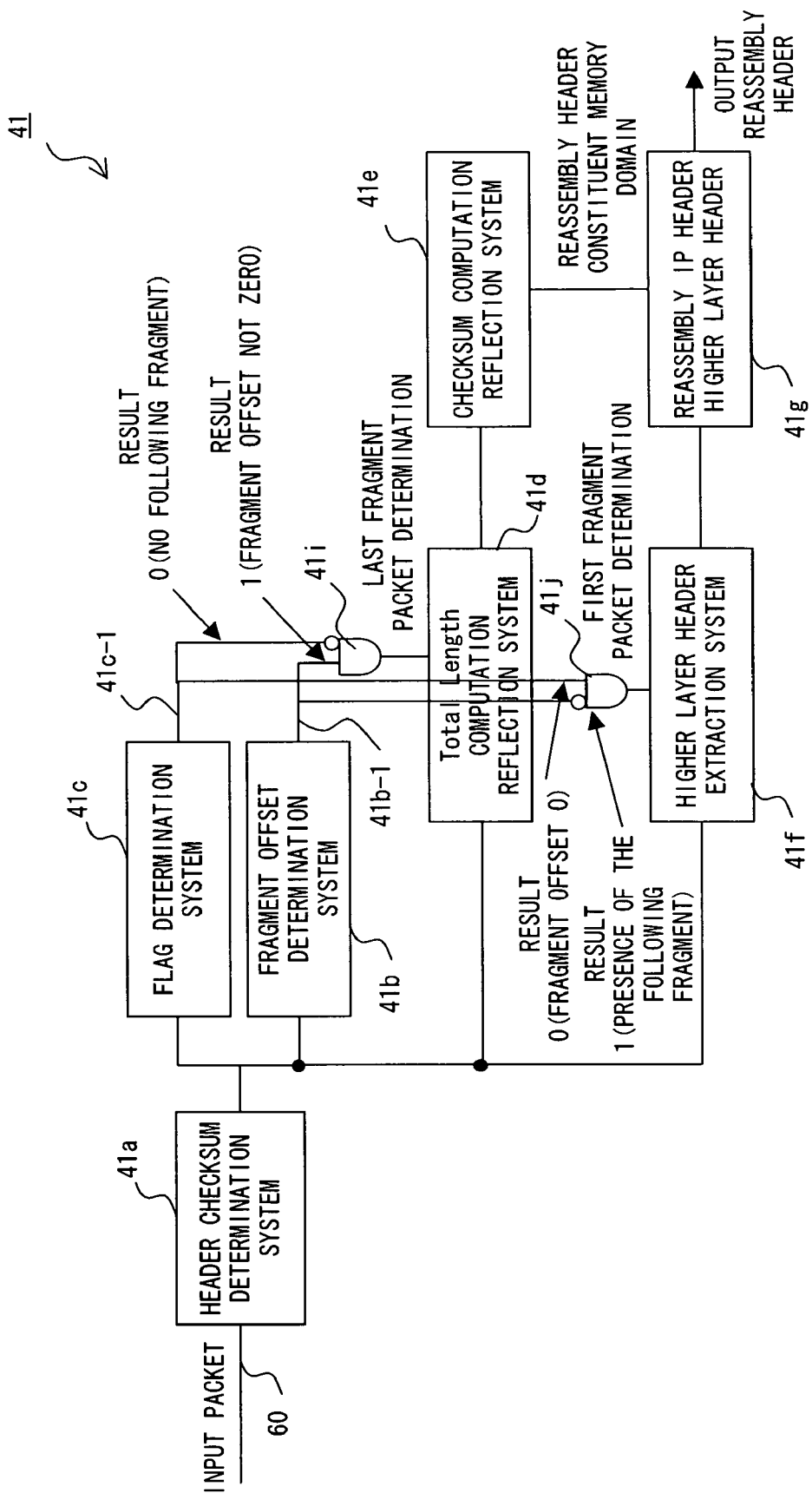
FIG. 12 is a schematic diagram showing an example of the configuration of the reassembly packet header generator comprised in the communication controller consisting the communication system, which is an embodiment of the present invention.

FIG. 12 shows an example implementation of the reassembly packet header generator 41 of the network card 20. The reassembly packet header generator 41 comprises, a header checksum determination system 41a, a fragment offset determination system 41b, a flag determination system 41c, a total-length computation system 41d, a checksum computation system 41e, a higher layer header extraction system 41f, a reassembly header constituent memory domain 41g, AND circuit 41i, and AND circuit 41j.

When the last fragment of the IP fragment packet 60 is provided to the reassembly packet header generator 41, the header checksum is determined. The fragment offset determination system 41b confirms that the fragment offset 61g is not 0, and the flag determination system 41c confirms that the IP packet is not followed by any fragments.

More specifically, the fragment offset determination system 41b outputs 0 when the fragment offset is 0, and 1 when the fragment offset is not 0 as the determination result 41b-1.

The flag determination system 41c outputs 1 when an IP packet is followed by more fragments, and 0 when an IP packet is not followed by any fragments as the determination result 41c-1.

The logically inverted determination result 41b-1 and the determination result 41c-1 are provided to the AND circuit 41j, which determines whether the packet is the first fragment packet. If the BOOLEAN AND operation results in 1, the packet is determined to be the first fragment packet, and the result is sent to the higher layer header extraction system 41f.

The determination result 41b-1 and logically inverted determination result 41c-1 are provided to the AND circuit 41i, which determines whether the packet is the last fragment packet. If the BOOLEAN AND operation results in 1, the packet is determined to be the last fragment packet, and the result is sent to the total length computation system 41d.

When the determination of the last packet fragment is completed by the AND circuit 41i, the total length computation system 41d is started and a new total length is calculated from the fragment offset 61g and packet length 61d (total length). The result is reflected in the header of the packet. The checksum computation system 41e calculates and updates the checksum of the header of the packet. The resulting reassembled IP header 51 is loaded into the reassembly header constituent memory domain 41g in the buffer memory 22.

When the first fragment packet is provided to the device, after determination of the checksum, the higher layer header extraction system 41f is controlled by the flag determination system 41c, fragment offset determination system 41b and the AND circuit 41j. Data including the higher layer header (TCP header 52 in this case) is extracted from the first fragment packet, and loaded into the reassembly header constituent memory domain 41g. This part does not have to be exactly the higher layer header, however, it has to include the higher layer header. The two headers in the reassembly header constituent memory domain 41g are combined and output as reassembly header 51-1.

Figure 13:
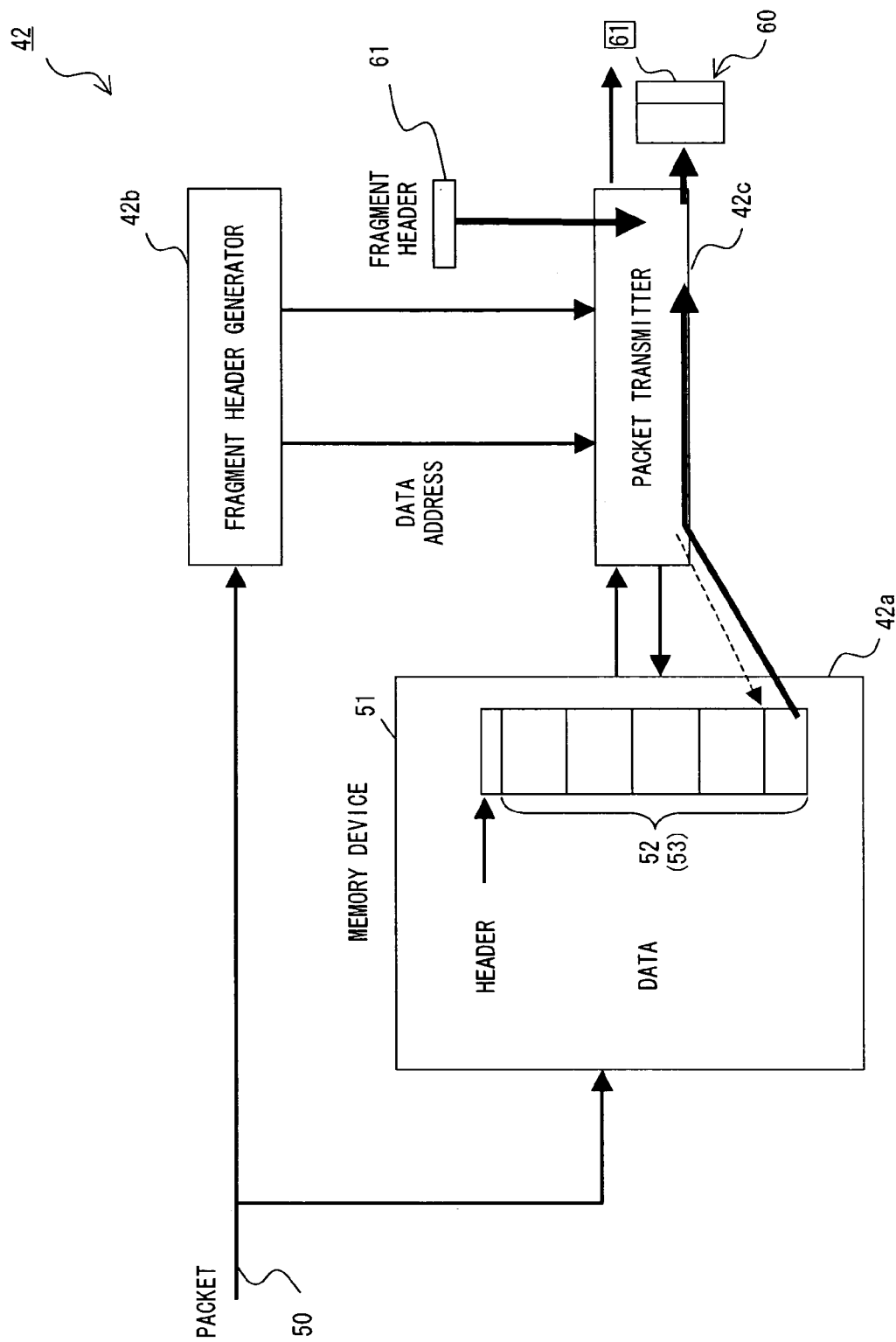
FIG. 13 is a schematic diagram showing an example of the configuration of the reassembly packet header advance transmitter comprised in the communication controller consisting the communication system, which is an embodiment of the present invention.

The explanation of the configuration of the reassembly packet header advance transmitter 42 in the network cards 20 is provided below with reference to FIG. 13. This reassembly packet header advance transmitter 42 is comprised of, for example, a network controller 21 in the network card 20 of the transmission side communication controller 20A.

The device comprises a memory device 42a, which stores the IP packet 50 received from the transmitting host 10A, a fragmented header generator 42b, which generates the IP fragment header 61 after fragmentation, a packet transmitter 42c, which forms the IP fragment packet 60 by combining the generated header and data, and transmits packets via the information network 30. An area of the buffer memory 22 can be used as the memory device 42a.

In order to ensure that transmission of the last fragment packet (i.e. the packet, used to generate the reassembly header 51-1 at the reception side communication controller 20B) precedes transmission of the other fragmented packets, the fragmented header generator 42b generates the last fragment header from the packet header, upon receiving the packet. The fragmented header generator 42b sends the header and the address of the data corresponding to the header to the packet transmitter 42c. The packet transmitter 42c requests the data from the memory device 42a using the acquired address, forms a packet by combining the data with the header and transmits the packet.

Figure 14:
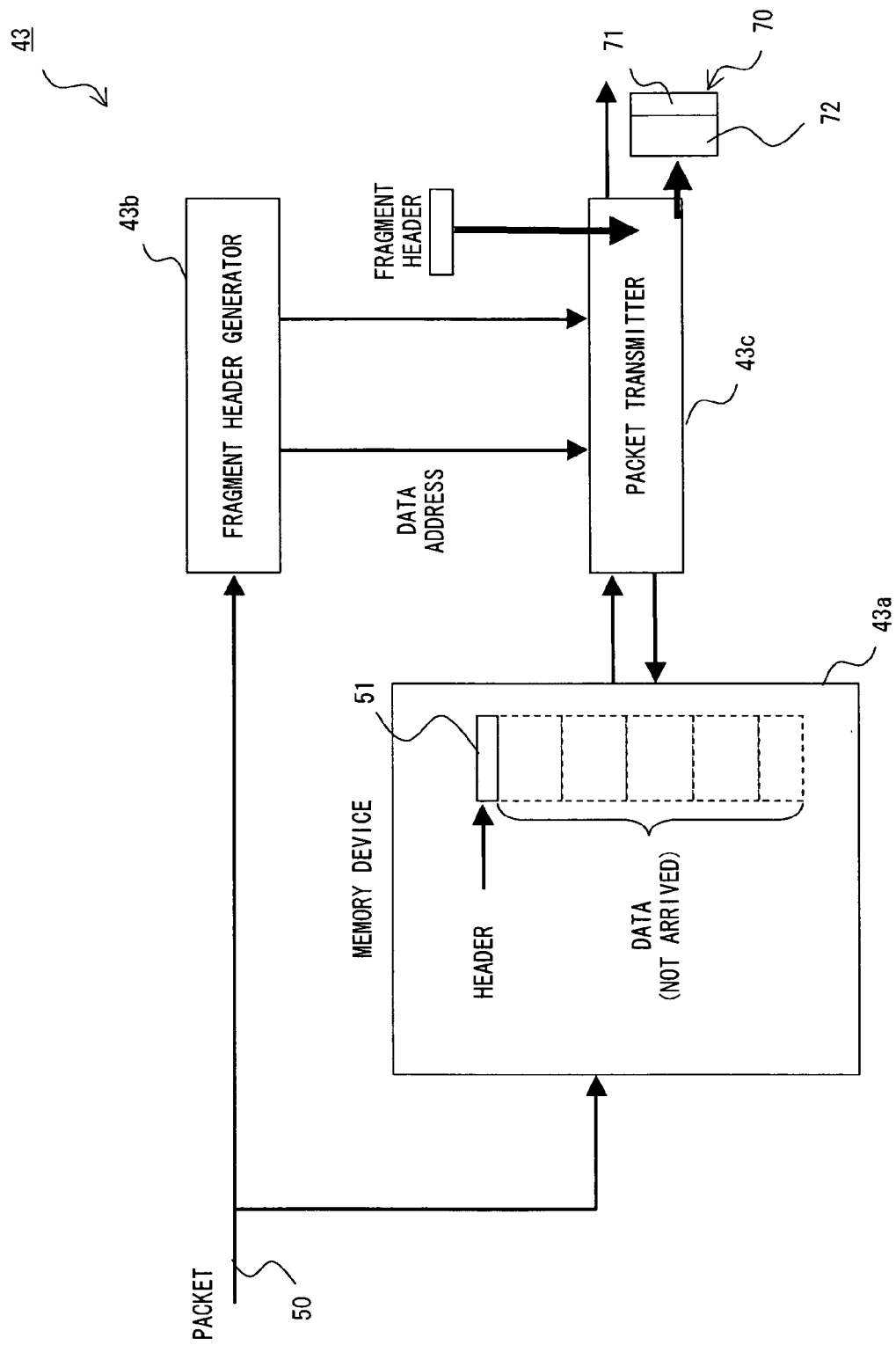
FIG. 14 is a schematic diagram showing an example of the configuration of the reassembly packet header duplication transmitter comprised in the communication controller consisting the communication system, which is an embodiment of the present invention.

An explanation of the implementation of the reassembly packet header duplication transmitter 43 in the network cards 20 of the transmission side communication controller 20A is provided with reference to FIG. 14. The reassembly packet header duplication transmitter 43 comprises a memory device 43a, which temporarily holds the IP packet 50 arriving from the transmitting host 10A, a fragmented header generator 43b, and a packet transmitter 43c. The reassembly packet header duplication transmitter 43 is implemented as a part of the network controller 21, for example.

It is not until reception of the entire IP packet 50 by the transmission side communication controller 20A from the transmitting host 10A that the above-mentioned reassembly packet header advance transmitter 42 can start the transmission of a fragment packet (the IP fragment packet 60). On the contrary, in the reassembly packet header duplication transmitter 43, the fragmented header generator 43b generates a redundant packet 70 (a tertiary packet) equivalent to the last IP fragment packet 60, which can be used to generate the reassembly header 51-1 at the reception side communication controller 20B at the point that the buffer memory 22 (the memory device 43a) in the transmission side communication controller 20A receives the header of the IP packet 50 before fragmentation. The redundant packet 70 is sent to the information network 30 via the packet transmitter 43c.

After transmission of the redundant packet 70, the fragment packet including the original data is transmitted. The reception side communication controller 20B generates the reassembly header 51-1 on the arrival of the redundant packet 70. The packet header 71 of the redundant packet 70 transmitted in advance of secondary packets and is implemented in a similar way to that of the IP fragment header 61 of the last IP fragment packet 60 of the fragmented packets. To be more specific, the packet header 71 is generated so as to be the same as the last fragmented packet of the original packet. All of the data 72 in the redundant packet 70 is null, set to 0. FIG. 14 describes the operation at the point of transmission of the redundant packet 70.

The reception side communication controller 20B cannot distinguish the advance transmission redundant packet 70 from the original last fragment packet (the last IP fragment packet 60). As a result, the reception side communication controller 20B uses the BOOLEAN OR value of the data of both packets (the data 53 of the IP fragment packet 60 and the data 72 of the redundant packet 70) as the data of the received packets. In order to reduce the loading of the BOOLEAN OR computation, fragmentation can be adjusted at the transmission side communication controller 20A so that the size of the last fragmented packet is made as small as possible. Specifically, the size of the second to last fragmented packet is adjusted so that the last fragmented packet is of a minimum size.

FIG. 15 gives an explanation of a reassembly completion notifier 44 comprised in the network card 20, which is the reception side communication controller 20B. The reassembly completion notifier 44 can be implemented as a part of the network controller 21.

The reassembly completion notifier 44 provides a system to provide notification of the completion of packet reassembly by the reception side communication controller 20B to the receiving host 10B and to help the receiving host 10B to check and recognize the reassembly completion of the reception side communication controller 20B after the receiving host 10B finishes the protocol processing. The receiving host 10B, after finishing the protocol processing of the reassembly header 51-1, checks the completion of the reassembly processing in the reception side communication controller 20B, and on recognizing the completion, transfers the data to the application (User process 12b).

The reassembly completion notifier 44 comprises a reassembly completion system 44a, which determines the completion of the reassembly processing in the reception side communication controller 20B and a flag writing system 44b, which writes the result to a designated notification domain 12c in the main memory 12 of the receiving host 10B. The notification domain 12c in the main memory 12 has an entry, which corresponds to a reassembly buffer address (comprised in every reassembly packet) of the buffer memory 22 in the network card 20. The receiving host 10B determines whether the reassembly of the IP packet 50 of the reassembly header 51-1 is completed or not by calculating the entry of the corresponding notification domain 12c from the reassembly buffer address transferred with the reassembly header 51-1 to the receiving host 10B.

FIG. 16 provides an explanation of the data error detector/notifier 45 comprised in the network card 20 as the reception side communication controller 20B. The data error detector/notifier 45 can be implemented as a part of the network controller 21. The data error detector/notifier 45 comprises a packet error determination system 45a, flag writing system 45b and reassembly buffer 45c.

In the data error detector/notifier 45, the packet error determination system 45a determines the checksum (the IP header checksum and the TCP header checksum) of the packet arriving from the information network 30 to the reception side communication controller 20B. When the packet is a fragment packet (the IP fragment packet 60) and has an error, the flag writing system 45b records the error in the notification domain 12c of the main memory 12 in the receiving host 10B, corresponding to the reassembly buffer 45c storing the fragment packet. By so doing, the receiving host 10B is notified of the reassembly failure.

The data error detector/notifier 45 can be implemented in combination with the reassembly completion notifier 44 described above. For example, it can be realized by the bit corresponding to the individual IP packet after reassembly in the notification domain 12c being changed from 1 bit to 2 bits.

The packet error determination system 45a calculates the checksum of the packet data, determining the IP header checksum of the input packet at the same time, and accumulates (sums up) the checksum in a checksum accumulation domain provided for every set of packets to be reassembled. At completion of reassembly, a pseudo-header checksum, for calculation of the TCP checksum from the above checksum, is added. By so doing, the presence or the absence of errors in the data is determined after reassembly. The error notification is set in the notification domain 12c when the presence of both of the IP header checksum error and the TCP header checksum error.

Figure 17:
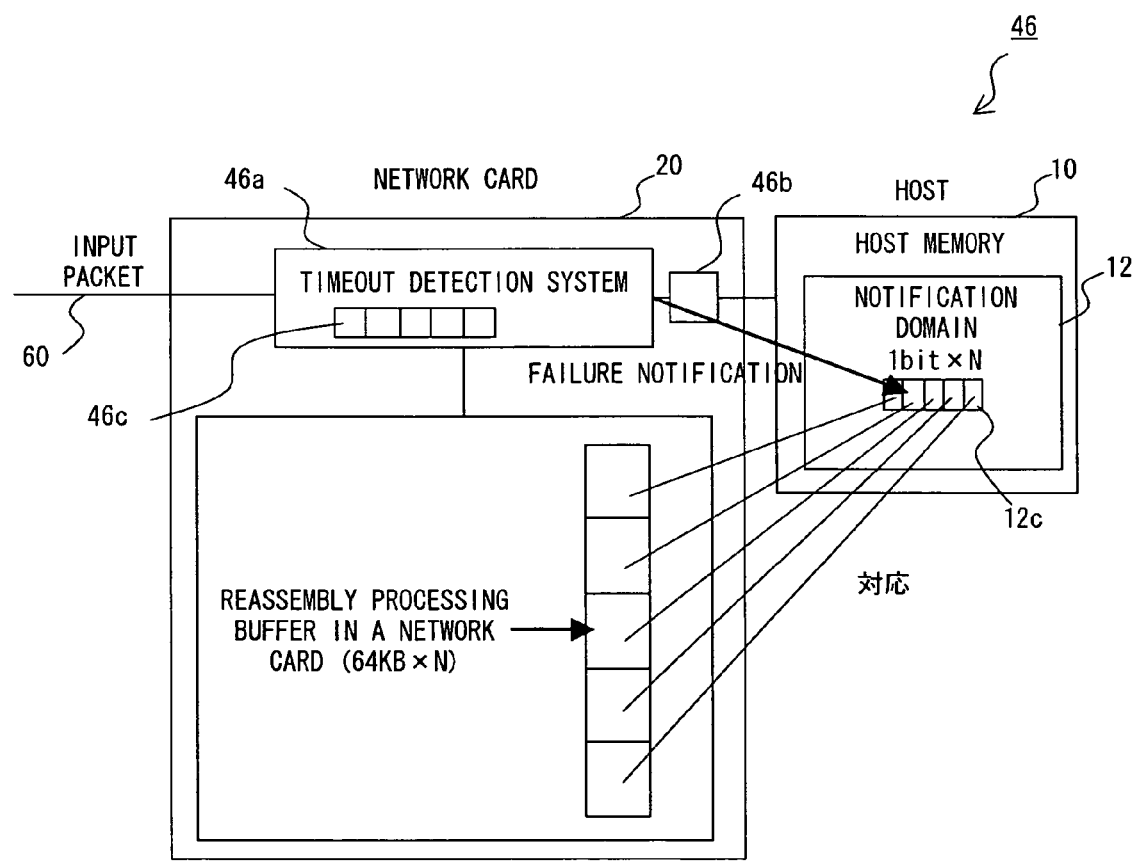
FIG. 17 is a schematic diagram showing an example of the configuration of the data timeout detector/notifier comprised in the communication controller consisting the communication system, which is an embodiment of the present invention.

The explanation of a data timeout detector/notifier 46 comprised in the network card 20 as the reception side communication controller 20B is given in FIG. 17. The data timeout detector/notifier 46 can be implemented as a part of the network controller 21.

The data timeout detector/notifier 46 starts a timer on the commencement of reassembly. If a reassembly timeout occurs, the reassembly failure is recorded in the notification domain 12c of the receiving host 10B. FIG. 17 is an example of an implementation, and the example comprises a timeout detection system 46a, a flag writing system 46b and timer counter 46c.

The data timeout detector/notifier 46 can be implemented in combination with the data error detector/notifier 45 described above, and can share a notification domain 12c with the data error detector/notifier 45.

The detection of timeout should be applied to each of a plurality of reassembly processes proceeding in parallel. For that reason, the timeout detection system 46a comprises timer counter 46c for each reassembly process. A plurality of timer counter 46c for each reassembly processes are summed up by the output of a timer. On the start of reassembly, 0 bit of the timer counter 46c of each reassembly process is cleared. When it reaches a certain value, a timeout trigger is generated. For example, the timer counters 46c for each reassembly process are set as 2-bit counters and they count up when the base one counter (10 bits, for example) are all 1. This setup reduces the number of bits of the timer counter 46c for every reassembly.

An explanation of the data nullification system 47 comprised in the information processor 10 as the receiving host 10B is provided with reference to FIG. 18. The data nullification system 47 can be implemented as a part of the Kernel 12a in the information processor 10.

The data nullification system 47 comprises a protocol processing program 47a, a protocol processing result temporary storage domain 47b and a protocol processing status setting domain 47c.

The data nullification system 47 is a system to nullify the protocol processing executed in advance in the receiving host 10B, when an error is detected by the above data error detector/notifier 45 or a timeout is detected by the data timeout detector/notifier 46.

The protocol processing program 47a of the receiving host 10B stores the result of the protocol processing in the protocol processing result temporary storage domain 47b until the completion of reassembly in the reception side communication controller 20B in carrying out the protocol processing of the reassembly header 51-1, and does not reflects the result in the status of protocol processing (the protocol processing status setting domain 47c), of the receiving host 10B.

On finishing the protocol processing, the protocol processing program 47a checks the error and timeout data stored in the notification domain 12c. When an error or a timeout is present, it drops the protocol processing result of the reassembly header 51-1 without reflecting the result in the status. When no error is found, the result is reflected in the protocol processing status setting domain 47c.

As explained above, according to the embodiment of the present invention, the transmission delay time caused by the reassembly in the receiving host 10B and the reception side communication controller 20B is prevented from increasing without negating the load reduction effect of the protocol processing in the transmitting host 10A and the receiving host 10B by dividing the IP packet 50 into the IP fragment packet 60 in the transmission side communication controller 20A and by the receiving reassembly processing, which recovers the IP packet 50 by reassembly of the IP fragment packet 60 in the reception side communication controller 20B.

In addition, both improvement of the throughput and reduction of the transmission delay time allow the effective utilization of the high-speed transfer capabilities of the information network 30.

In other words, a high-speed computer network is achieved by the transmitting host 10A and the receiving host 10B effectively utilizing the information transmission rate of the information network 30.

The present invention is not limited to the above-described preferred embodiment. Various changes can be, of course, made without departing from the scope of the invention.

According to the present invention, it is possible to reduce both of the loading of the host computer by the fragmentation and reassembly of the transmitted and received packets, and the transmission delay time of the transmitted and the received packets.

It is also possible to realize both effective utilization of transmission speed of the information network by the fragmentation and reassembly of the transmitted and received packets, and reduction of the transmission delay time of the transmitted and the received packets.

What is claimed is:

1. A control method of a communication system, comprising:
   dividing a primary packet of an Internet Protocol (IP) output from a first information processor at a transmitting side into a plurality of secondary packets of said IP in a first communication controller at said transmitting side;
   sending said plurality of secondary packets to a network by said first communication controller;
   receiving said plurality of secondary packets in a second communication controller at a receiving side;
   generating, in said second communication controller, a reassembly header with an IP header and a Transmission Control Protocol (TCP) header for processing said primary packet to be reassembled, where said generating is performed by:
      calculating a length of said primary packet to be reassembled using information included in a last one of said plurality of secondary packets that is last in order of said dividing, where said information includes a packet length and a fragment offset of said last one of said plurality of secondary packets,
      obtaining said TCP header included in an initial one of said plurality of secondary packets that is initial in order of said dividing, and
      putting, in said reassembly header, both said IP header whose total length is set to said calculated length and said TCP header;
   sending said reassembly header from said second communication controller to a second information processor at said receiving side;
   executing, at said second information processor, protocol processing that includes analyzing said reassembly header to analyze the contents of said IP and TCP headers included in said reassembly header;
   temporarily storing a result of said protocol processing in said second information processor;
   reassembling said plurality of secondary packets into said primary packet in said second communication controller in parallel with said executing;
   upon completion of said reassembling, sending said reassembled primary packet from said second communication controller to said second information processor and allowing, at said second information processor, said temporarily stored result of said protocol processing to be reflected in a status of said protocol processing, wherein
   said protocol processing includes:
      checking a size of said TCP header and a size of said IP header,
      verification of a header checksum of said IP header,
      identifying a connection in accordance with a determination of a source-destination port pair of a TCP session,
      determination of whether received data is within volume of a receive window, said determination being made from a sequence number field of said TCP header and a data size of said primary packet, or
      reading an acknowledgement number field of said TCP header in said received primary packet to recognize a status of reverse stream transfer, or
      any combination thereof.

2. The control method of said communication system according to claim 1, wherein said first communication controller sends said initial and last ones of said plurality of secondary packets comprising data required for generation of said reassembly header to said network in advance of a rest of said initial and last ones of said plurality of secondary packets.

3. The control method of said communication system according to claim 1, wherein said plurality of secondary packets is a plurality of Internet Protocol fragments generated from said primary packet by fragmentation.

4. The control method according to claim 1, wherein said executing, at said second information processor, begins said protocol processing prior to reassembling all of said secondary packets at said second communication controller.

5. A control method of an information processing system, comprising an information processor and a communication controller lying between said information processor and a network, wherein said control method comprises:
   receiving, at said communication controller, a plurality of secondary packets of an Internet Protocol (IP) fragmented from a primary packet and sent out to said network at a transmitting side;
   generating, at said communication controller, a reassembly header with an IP header and a Transmission Control Protocol (TCP) header for processing said primary packet to be reassembled, said generating including:
      calculating a length of said primary packet to be reassembled using information included in a last one of said plurality of secondary packets that is last in order of said fragmentation, where said information includes a packet length and a fragment offset of said last one of said plurality of secondary packets,
      obtaining said TCP header included in an initial one of said plurality of secondary packets that is initial in order of said fragmentation, and
      putting, in said reassembly header, both said IP header whose total length is set to said calculated length and said TCP header;
   sending said reassembly header from said communication controller to said information processor;
   reassembling, in said communication controller, said primary packet from said plurality of secondary packets, where said sending of said reassembly header is performed before completion of said reassembling;
   executing protocol processing in which said information processor analyzes said reassembly header to analyze the contents of said IP and TCP headers included in said reassembly header in parallel with said reassembly processing in said communication controller;
   temporarily storing a result of said protocol processing in said information processor; and
   upon completion of said reassembling, sending said reassembled primary packet from said communication controller to said information processor and allowing, at said information processor, said temporarily stored result of said protocol processing to be reflected in a status of said protocol processing, wherein
   said protocol processing includes:

checking a size of said TCP header and a size of said IP header,
verification of a header checksum of said IP header,
identifying a connection in accordance with a determination of a source-destination port pair of a TCP session,
determination of whether received data is within volume of a receive window, said determination being made from a sequence number field of said TCP header and a data size of said primary packet, or
reading an acknowledgement number field of said TCP header in said received primary packet to recognize a status of reverse stream transfer, or
any combination thereof.

6. The control method of said information processing system according to claim 5, wherein
said communication controller comprises a notification function for notifying completion of said reassembly processing of said information processor via a notification field set up in a memory in said information processor,
said information processor determines whether said reassembly processing is complete or not with reference to said notification field before transferring data from said primary packet to an application after finishing said protocol processing using said reassembly header, and
said information processor starts to transfer said data when said reassembly processing is determined to be completed.

7. The control method of said information processing system according to claim 5, wherein
said communication controller comprises an error detector for detecting an error in at least one of said plurality of secondary packets received in said communication controller, and
said error detector notifies said information processor at a receiving side of failure of said reassembly processing when said plurality of secondary packets to be reassembled comprises one or more error packets.

8. The control method of said information processing system according to claim 5, wherein
said communication controller at a receiving side comprises a timer, and
said communication controller notifies said information processor at said receiving side of failure of said reassembly processing when one or more of said plurality of secondary packets to be reassembled into said primary packet fails to arrive within a designated time period.

9. The control method of said information processing system according to claim 8, wherein
when said information processor at said receiving side is notified of said failure of said reassembly processing from said communication controller at said receiving side,
cancellation of processing for said primary packet is conducted even though said protocol processing and said reassembly processing have already started, and
said cancellation comprises:
dropping, by said information processor, said reassembly header which has already been received;
stopping data transfer to said information processor from said communication controller;
stopping sending of transmission confirmation from said information processor, if required; and
dropping data of said plurality of secondary packets to be reassembled into said primary packet by said communication controller.

10. A communication system, comprising:
a first communication controller at a transmitting side that divides a primary packet of a first information processor into a plurality of secondary packets and sends said plurality of secondary packets to a network, where said primary packet and said plurality of secondary packets are of an Internet Protocol (IP);
a second communication controller at a receiving side, including:
a reassembly packet header generator that generates a reassembly header with an IP header and a Transmission Control Protocol (TCP) header by:
calculating a length of said primary packet to be reassembled using information included in a last one of said plurality of secondary packets that is last in order of said dividing where said information includes a packet length and a fragment offset of said last one of said plurality of secondary packets,
obtaining said TCP header included in an initial one of said plurality of secondary packets that is initial in order of said dividing, and
putting, in said reassembly header, both said IP header whose total length is set to said calculated length and said TCP header, and
a reassembly packet header advance transmitter that sends out said reassembly header to a second information processor at said receiving side before completion of reassembly processing to reassemble said primary packet from said plurality of secondary packets; and
a kernel that
executes protocol processing by analyzing said reassembly header to analyze the contents of said IP and TCP headers included in said reassembly header, in parallel with said reassembly processing,
temporarily stores a result of said protocol processing, and
allows said temporarily stored result of said protocol processing to be reflected in a status of said protocol processing upon completion of said reassembling by said second communication controller, wherein
said protocol processing includes:
checking a size of said TCP header and a size of said IP header,
verification of a header checksum of said IP header,
identifying a connection in accordance with a determination of a source-destination port pair of a TCP session,
determination of whether received data is within volume of a receive window, said determination being made from a sequence number field of said TCP header and a data size of said primary packet, or
reading an acknowledgement number field of said TCP header in said received primary packet to recognize a status of reverse stream transfer, or
any combination thereof.

11. The communication system according to claim 10, wherein said kernel begins said protocol processing prior to reassembling all of said plurality of secondary packets.

* * * * *